(12) United States Patent
Locker

(10) Patent No.: US 10,165,766 B2
(45) Date of Patent: Jan. 1, 2019

(54) HORIZONTALLY BALANCED SYMMETRICAL FISHING LURE

(71) Applicant: Robert A. Locker, Bozeman, MT (US)

(72) Inventor: Robert A. Locker, Bozeman, MT (US)

(*) Notice: Subject to any disclaimer, the term of this patent is extended or adjusted under 35 U.S.C. 154(b) by 93 days.

(21) Appl. No.: 14/863,723

(22) Filed: Sep. 24, 2015

(65) Prior Publication Data
US 2017/0086435 A1 Mar. 30, 2017

(51) Int. Cl.
*A01K 85/14* (2006.01)
*A01K 83/00* (2006.01)
*A01K 85/10* (2006.01)

(52) U.S. Cl.
CPC .......... *A01K 85/14* (2013.01); *A01K 83/00* (2013.01); *A01K 85/10* (2013.01)

(58) Field of Classification Search
CPC ........ A01K 85/14; A01K 85/10; A01K 85/00; A01K 83/00
USPC ........................................ 43/42, 42.52, 42.5
See application file for complete search history.

(56) References Cited

U.S. PATENT DOCUMENTS

| | | | | |
|---|---|---|---|---|
| 813,718 A * | 2/1906 | Knowles | ............ | A01K 85/16 43/42.04 |
| 835,766 A * | 11/1906 | Strehlow | ............ | A01K 85/14 43/42.4 |
| 888,935 A * | 5/1908 | Sams | ............ | A01K 85/14 43/42.52 |
| 1,002,981 A * | 9/1911 | Ford | ............ | A01K 85/14 43/42.44 |
| 1,334,022 A * | 3/1920 | Dubrow | ............ | A01K 85/14 43/42.51 |
| 1,657,966 A * | 1/1928 | Jordan | ............ | A01K 85/14 43/42.49 |
| 1,754,073 A * | 4/1930 | Yates | ............ | A01K 85/14 43/42.52 |
| 1,763,031 A * | 6/1930 | Yates | ............ | A01K 85/14 43/42.52 |
| 1,855,096 A * | 4/1932 | Chamberlaine | ............ | A01K 85/14 43/42.41 |
| 1,855,097 A * | 4/1932 | Chamberlaine | ............ | A01K 85/16 43/42.45 |
| 2,119,805 A * | 6/1938 | Davenport | ............ | A01K 85/16 43/42.52 |
| 2,214,409 A * | 9/1940 | Eaby | ............ | A01K 85/14 43/42.52 |
| 2,333,590 A * | 11/1943 | Schueller | ............ | A01K 85/16 43/42.05 |
| 2,713,742 A * | 7/1955 | Holdaway | ............ | A01K 85/00 43/42.38 |
| 2,817,922 A * | 12/1957 | Takeshita | ............ | A01K 85/00 43/42.28 |
| 2,871,046 A * | 1/1959 | Smith | ............ | A01K 83/00 24/656 |
| 2,884,733 A * | 5/1959 | Smith | ............ | A01K 85/14 403/314 |
| 3,094,804 A * | 6/1963 | Walton | ............ | A01K 85/14 43/42.23 |

(Continued)

*Primary Examiner* — Magdalena Topolski

(57) ABSTRACT

A concave, flat, or convex metal, plastic, or composite bodied lure with somewhat pointed and similar ends and a jig hook which extends through the center of the body and is connected in a channel that proceeds to the rear, causing the lure to suspend in a horizontal position and produce a variety of attractive movements when the rod is jigged vertically or otherwise manipulated.

14 Claims, 7 Drawing Sheets

(56) References Cited

U.S. PATENT DOCUMENTS

| | | | | |
|---|---|---|---|---|
| 3,126,661 | A | * | 3/1964 | Phillips .................. A01K 85/14 43/42.39 |
| 3,153,876 | A | * | 10/1964 | Multanen ................ A01K 85/14 43/42.09 |
| 3,724,117 | A | * | 4/1973 | Flanagan, Jr. .......... A01K 85/14 43/42.24 |
| 3,922,811 | A | * | 12/1975 | Ellingson ................ A01K 85/16 43/42.02 |
| 4,432,157 | A | * | 2/1984 | Gowing ................. A01K 85/14 43/42.31 |
| 4,765,086 | A | * | 8/1988 | Schultz .................. A01K 85/02 43/42.52 |
| 4,771,568 | A | * | 9/1988 | Head ...................... A01K 85/00 43/42.29 |
| 5,157,859 | A | * | 10/1992 | Wirkus .................. A01K 85/00 43/42.37 |
| 5,279,065 | A | * | 1/1994 | Drury, Jr. ............... A01K 85/14 43/42.52 |
| 5,461,819 | A | * | 10/1995 | Shindledecker ....... A01K 85/14 43/42.11 |
| 5,564,219 | A | * | 10/1996 | Petri ...................... A01K 85/00 43/42.28 |
| 5,806,234 | A | * | 9/1998 | Nichols .................. A01K 85/00 43/42.37 |
| 2003/0163944 | A1 | * | 9/2003 | Ooten Hanes ......... A01K 85/14 43/42.19 |
| 2012/0285072 | A1 | * | 11/2012 | Rosko .................... A01K 85/16 43/42.31 |
| 2014/0290119 | A1 | * | 10/2014 | Onishi ................... A01K 85/14 43/42.52 |
| 2017/0013815 | A1 | * | 1/2017 | Cook ..................... A01K 85/14 |

\* cited by examiner

HORIZONTALLY BALANCED SYMMETRICAL FISHING LURE

FIELD OF THE INVENTION

The present invention relates to a horizontal balanced concave fishing lure with both ends similarly shaped (symmetrical) as in a willow leaf spinner blade and more particularly to a lure that is connected at its horizontal balanced or mid point, creating a more lifelike appearance and action.

BACKGROUND OF THE INVENTION

The last dozen or so years have seen a huge increase in vertical jigging methods. This includes several techniques designed for vertical presentation such as drop shoting which will be explained in full in the Detailed Description section. Probably the most pronounced use of new jigging techniques is in the sport of ice fishing throughout the Northern Hemisphere. This, of course, is mainly limited to vertical presentations of bait and or lures . . . or a combination of the two.

The vertical manipulation methods (other than drop shoting) are often done with existing lures which were designed for standard casting and/or trolling techniques. Although they can be successful, it is generally in spite of the design and function rather than because of it, and this has limited unnecessarily, the success of the angler.

One solution is a small group of Jigging lures by Normark/Rapala led by the. "Jigging Rap" which were specifically designed to rest in a horizontal position. It can be worked up and down by jigging the rod tip in various ways. Some horizontal side movement can be achieved.

Another lure that has been effective for many decades is the Swedish Pimple by Bay-de-Noc Fishing products company of Gladstone Mich. It often sells the Swedish Pimple lure with a tear dropped shaped attractor attached which greatly aids the presentation when jigged vertically. They also promote the placement of bait on the hooks such as perch eyes, small section of worm or maggots and other real baits which have both natural scent and some movement with very little motion to the rod tip.

A third group of lures that often rest horizontally are weighted jigs. They can be fished vertically, but more often are used as casting lures which is benefited by fact that the size of the jig head can vary and the increased weight adds to the distance the lure can be cast and/or how quickly it will descend.

Another group of more recent lures are very small jig style lures specifically designed for ice fishing for "panfish".

No other lures of which I am aware use the center balance point beyond the Normark/Rapala In the case of the Normark/Rapala Jigging Rap it is very expensive to manufacture and therefore equally expensive to purchase by the angler. Although it has good visual appeal to the fish, it is distracted by large hooks protruding out both of the horizontal ends. Its success is really the result of the unique but effective horizontal position of the lure itself and the ability to make it dart in one direction or anther by skilled manipulation by the angler.

The Swedish Pimple is aided by the tear drop shaped attractor which is often attached and their suggestion (in the marketing materials) that live or real bait be added. The fact remains that the lure rests in a vertical position, which is unnatural for a minnow imitation to suspend in a vertical mode.

It is very surprising that no other concepts have evolved which attach at the center of the lure except inventions being offered by this inventor. One of the author's inventions is a bar shaped lure with equal sections on both ends. But this inventor will readily admit that one shortcoming of this lure is it also suspends in a vertical position when not being worked or jigged.

The ice jigging lures are sometimes well balanced horizontally, but seldom resemble a minnow and are more often tipped with actual bait such as maggots, meal worms, or a small piece of worm, and are generally designed to imitate insect larva. There is usually little weight involved so the use is mainly lowering vertically through a hole in the ice and its success is usually limited to panfish.

SUMMARY OF THE INVENTION

In accordance with the present invention, there is provided a concave bodied lure with equal ends and a jig hook which extends through the center of the body causing the lure to suspend in a horizontal position when at rest and produce a variety of attractive movements when the rod is twitched, or more aggressively jigged up and down.

It would be advantageous to provide a fishing lure that is connected to the line at the horizontal balance point.

It would also be advantageous to provide a lure to which the hook portion can be secured in a groove or channel from the center hole of the body extending to the rear allowing the hook to be glued, braised, or soldered in a secure position.

It would further be advantageous to provide a vertical extension of the jig hook which provides both the center balance point connection and the ability to attach a split shot of various sizes to change the weight and therefore the action and fishing characteristics of the lure.

It would be a further advantage to provide a method to attach various enticements to the rear portion either in the form of bait, physical attractor, or both.

It would further be advantageous to provide for different shapes of concave symmetrical lure bodies with the midpoint balance position connection to the fishing line.

It would also be advantageous to provide a jig hook with a molded round weight (painted or with decal) to resemble an eye of a bait fish) attached.

It would further be advantageous to have the alternate attachment at the front of the lure for most casting applications It would be most advantageous to have small lure sizes and little or no attached weight and a front connection for fly rod presentations. which normally use the weight of the line not the lure) for casting.

Another advantage is to provide a flat horizontally balanced symmetrical fishing lure variation.

Also advantageous would be to provide a fishing lure balanced centrally and symmetrically that is convex.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
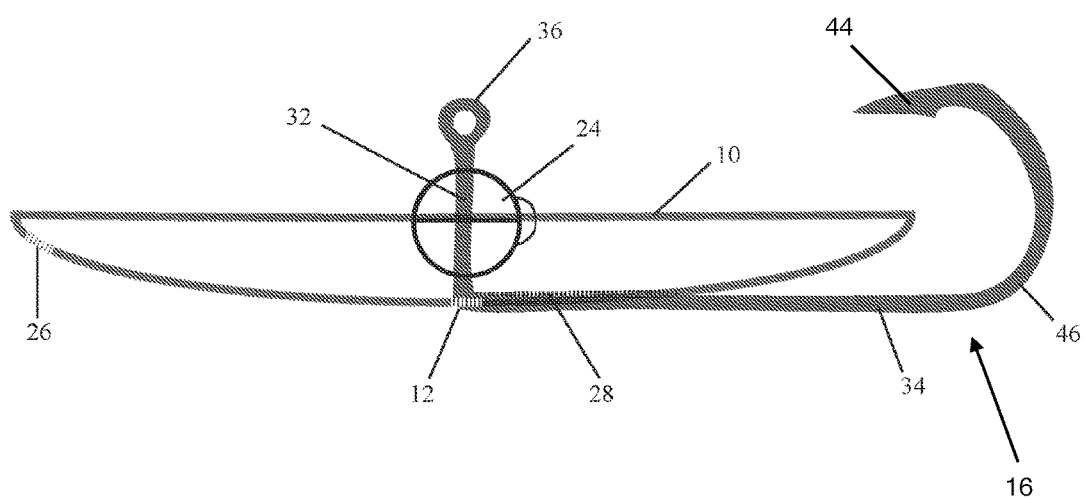
FIG. 1 is a side view of a horizontal willow leaf blade lure.

FIG. 1 is a side view of a horizontally balanced fishing lure. Although willow leaf blades are widely used in fishing lures it has been limited to use as a spinning blade. That spinning blade is connected to a spindle at the end point with the purpose of "spinning" around this spindle or shaft, thereby creating vibration and attracting various species of fish. This adaptation of a spinner blade and existing jig hook 16 creates an entirely new category of lures by connecting a spinner blade like concave lure body to the fishing line at it's mid point, or balanced position. Therefore the blade rests in a horizontal position with the concave side down, presenting a much more natural appearance such as a minnow or other bait fish assumes while resting.

Because of the lure's boat like shape it will slide from side to side and front to back as it is allowed to settle through the water column, thereby resembling a wounded bait fish in both appearance and behavior. This is created by the concave shape of the blade and its connection at the center hole 12 or mid point. When the lure is raised, the water must find its way out of the "boat" thus creating a pressure release which emulates the sound of a bait fish to predator fish. This balance point is further affected by the addition of an attractor 38 (see, for example, FIG. 3) to the bend of the hook or some form of bait to the rear portion of the hook.

Figure 3:
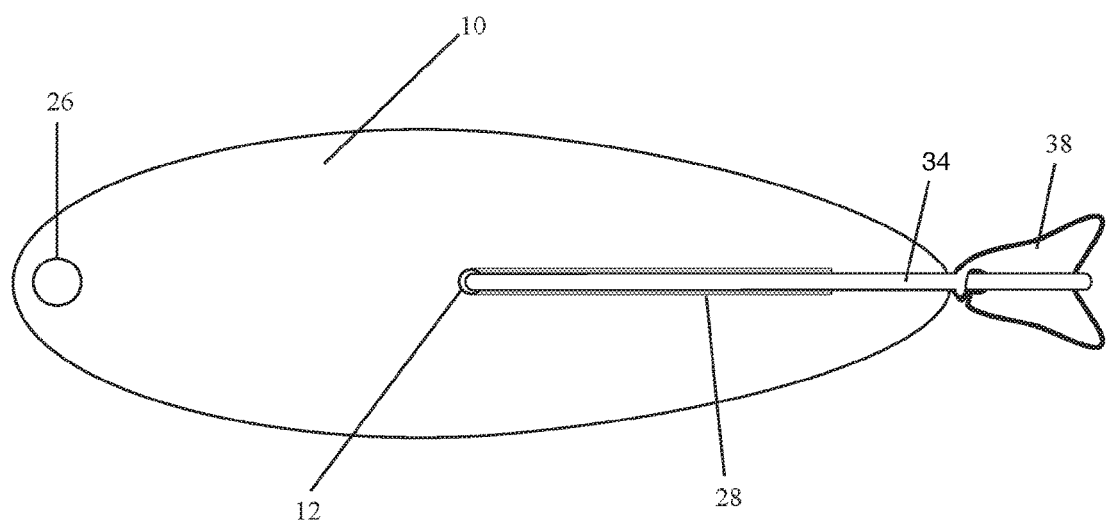
FIG. 3 is a bottom view of a willow leaf balanced lure illustrating the jig hook channel for connection of the jig hook to the lure body.
Figure 5:
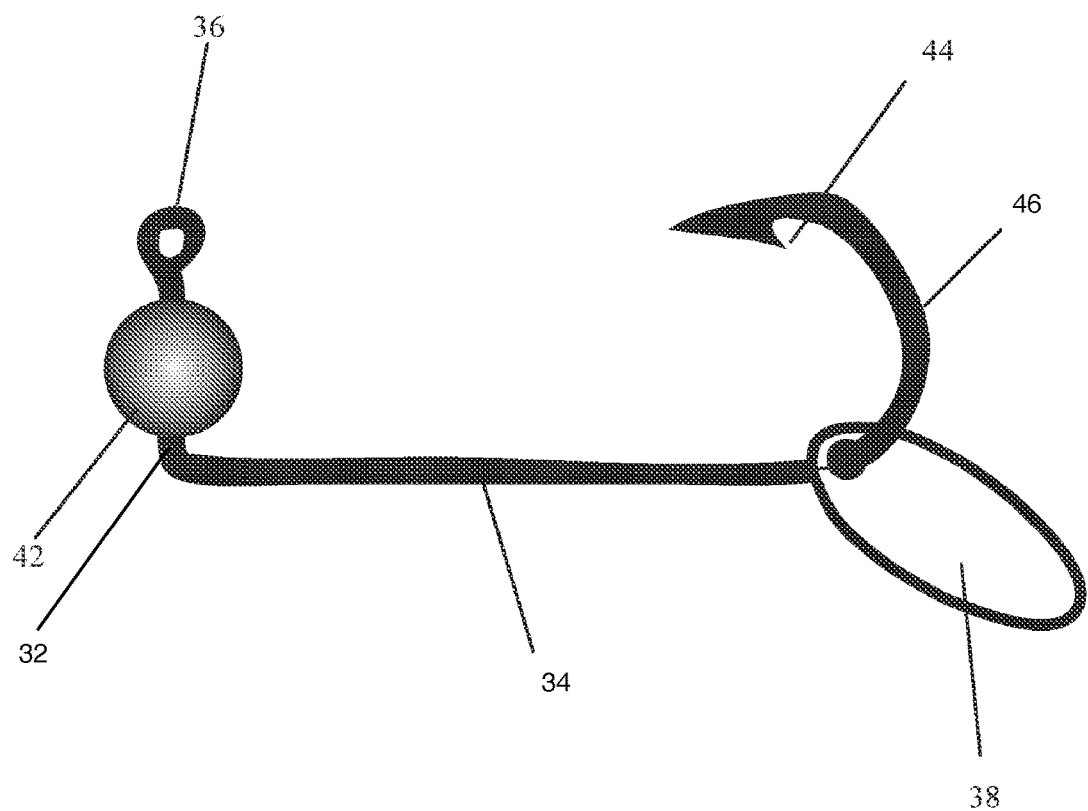
FIG. 5 is a side view of a jig hook with mold weight.

FIGS. 3 and 5 show how an attractor 38, such as the clip on attractors filed by this inventor, can be clipped to jig hook 16 including at its bend 46 or curved portion of the hook giving it very enticing action when merely twitched very lightly.

A very important use of the lure (without weight on the jig hook 16) is for fly fishing. Because the weight is very slight it allows fly fishermen (using the principal of the weight of the line essentially casting the fly or lure) to project the fly. This lure can be easily cast and worked with fly fishing gear, opening up a totally new undiscovered adaption.

Figure 2:
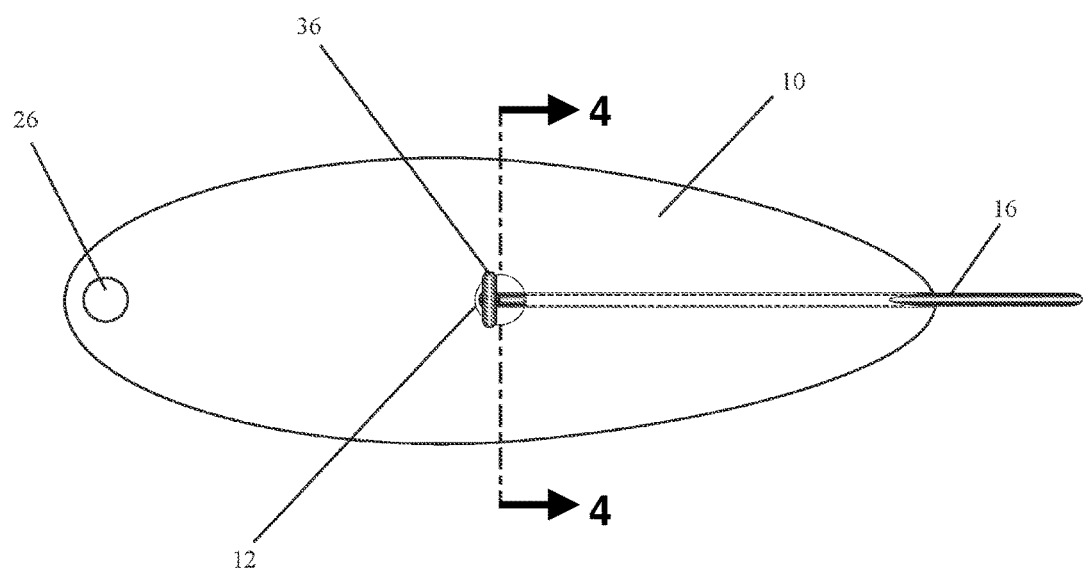
FIG. 2 is a top view of a horizontally balanced center hole fishing lure.

FIG. 2 is a top view of a willow leaf shaped lure. looking down on the willow leaf shaped body 10 or blade, further illustrating the midpoint or balance point. There is a center hole 12 near the mid-point of the blade just slightly forward of the middle. This slightly forward placement is because the jig hook 16 terminal portion extends slightly beyond the rear end of the blade and this location allows the lure to rest in a horizontal position. Also when bait or an attractor 38 is added to the hook, it will affect the balance point slightly depending on the weight of the added element.

The jig hook stem 32 (see, for example, FIG. 1) protrudes up through the center hole 12 and is terminated with the jig hook eye 36, which is the main attachment point. This is key to the action that is produced when the lure is fished using an up and down jigging motion or slight twitching action.

The small center hole 12 allows the jig hook barb 44 to be inserted through the center hole 12 to thread the jig hook 16 through the willow leaf shaped body 10 and in position for solder, glue or weld connection. The FIG. 1 view also shows the location of the jig hook channel 28 which extends from the center hole 12 to the rear portion of the willow leaf shaped body 10. Channel 28 is further illustrated in FIG. 3 described below.

FIG. 3 is a bottom view of a willow leaf shaped body 10 showing the placement and connection to the body of a jig hook 16. Jig hooks have been previously used with a mold generally filled with lead or more environmentally friendly metals, often with some form of attraction material (attractor 38) such as buck tail or Mylar etc. to resemble a minnow at rest. It is so widely useful and effective because the jig hook 16 is held at a horizontal position and when "worked" by the angler it looks and acts like a minnow trying to escape or is injured in some way.

That is precisely why this new form of horizontally suspended lure is both highly effective and inexpensive to construct. Other forms of elaborate lures, such as the Normark/Rapala's "Jigging Rap" and "Ripping Rap", are proven to be effective for species such as walleyes and northern pike and owe their success mainly to the fact that they are attached at the balance point as well. However, they are very expensive to produce and therefore equally expensive for the angler to purchase. In addition, they are not nearly as effective for panfish and trout that normally feed on smaller quarry.

FIG. 3 shows how the jig hook shank 34 rests in the jig hook channel 28 allowing this portion of the hook to solidify the jig hook 16 by using solder, weld, or glue to surround the jig hook shank 34 and rigidly connect the hook to the willow leaf shaped body 10.

Figure 4:
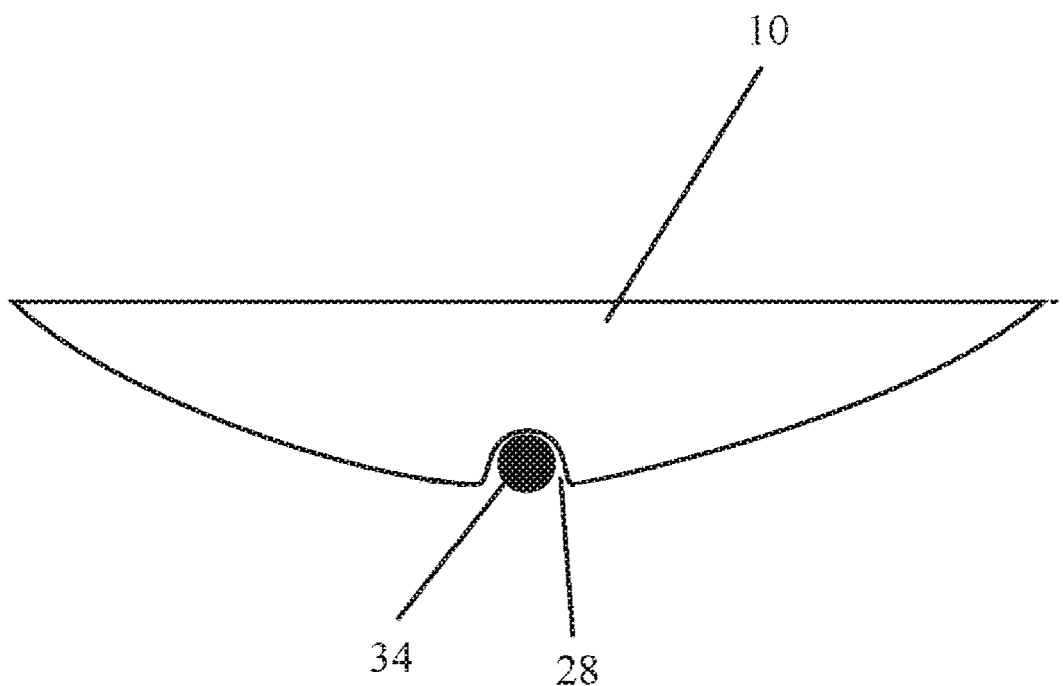
FIG. 4 is a cross section view of a willow leaf shaped horizontal fishing lure illustrating its mid or balance point.

FIG. 4 is a cross section view of the willow leaf shaped horizontal fishing lure of FIG. 2, illustrating its mid or balance point. These figures not only show how the jig hook shank 34 rests in the jig hook channel 28, but also how the connection stem extends vertically to the attachment eye. This further illustrates how the angler can add weight to the stem in the form of various sizes of split shot 24 (see, for example, FIG. 1). The type of split shot 24 preferred would be the type that has flaps for easy removal if the weight is preferred to be changed or removed. This can be important for fishing in relatively deep water as the rate of descent is a significant factor, as is the ability to cast.

Although mainly designed as a vertical jigging lure it can be cast and fished much as any jig with a metal head making this more versatile than almost any type of artificial lure. This is achieved by using the option to attach the line (using a terminal snap and swivel) to the front connection hole 26 (see, for example, FIG. 1). It has further versatility and attraction when attaching to the center hole 12, and with or without a split shot 24, and used in a more conventional manner by casting or trolling the lure. Here the concave nature of the willow leaf shaped body 10 creates resistance which translates to vibration and other sounds audible and attractive to fish. Furthermore, when the lure is allowed to settle, the erratic slip-sliding action will resume, whichever attachment point is used.

It is anticipated that this design will become the centerpiece of an entirely new group of lures which attach at the center or balance point and have a wide variety of highly attractive movements That is why the inventor should be given a reasonably wide degree of associated claims so that his novel idea can be further augmented by future patents under his name.

FIG. 5 shows a side view of typically molded jig hook 16 with the intended amount of weight 42 already attached. Often the lead or titanium weight placed on the molded hook will cover both the jig hook stem 32 and a small portion of the jig hook shank 34. In the case of the horizontally balanced fishing lure the jig hook stem 32 may be extended somewhat to allow the mold portion to only cover the jig hook stem 32, depending on the size of the overall weight desired.

The advantage of the precast jig hook 16 (with molded eye weight 42 already attached) is that it is somewhat simpler to solder, glue, or weld the jig hook 16 to the willow leaf shaped body 10. with more rigidity. It also allows for the weight portion to be colored to resemble a bait fish eye, which will be attractive to almost all gamefish. Furthermore it simplifies the process for the angler, in that a split shot 24 will not need to be attached as a separate step. It is suspected that most anglers will find a particular weight of lure most advantageous for each different application and targeted species of game fish.

FIG. 5 also further illustrates the function of the jig hook barb 44 to prevent a clip-on attractor 38 from slipping off the shank of the hook. The diameter of attractor 38 connecting hole will be slightly larger than the jig hook shank 34 to allow freedom of motion, but not so large as to allow the attractor 38 to slide by the combined diameter of the shank and the jig hook barb 44.

What makes this lure so efficient (in terms of production costs), is both the willow leaf shaped body 10 and the jig hook 16, without weight and with molded weight are produced in large numbers for a long time making the cost of these elements very competitive. The fact that the function of these two elements (connected and used in the previously described ways) makes the lure produce unusual and effective motions and sounds.

Figure 6:
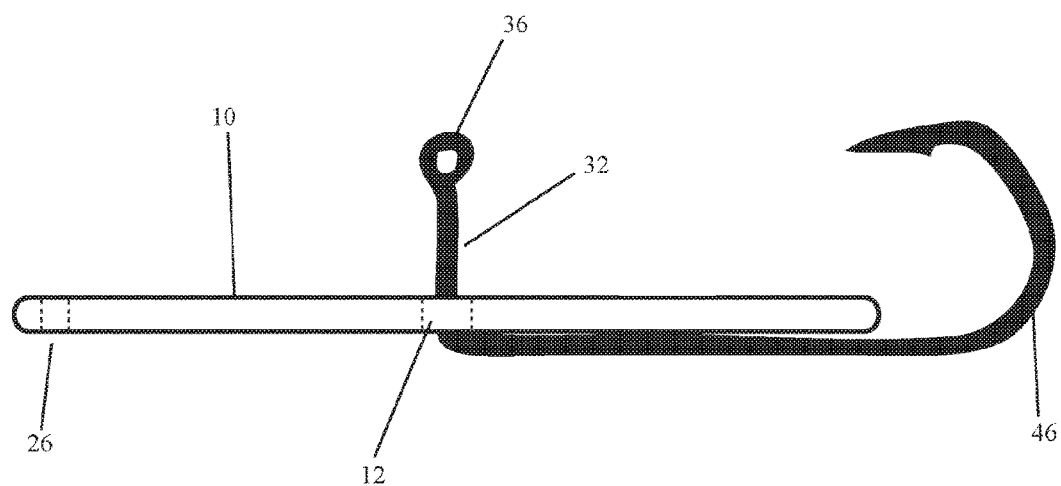
FIG. 6 is a side view of a flat horizontally balanced fishing lure.

FIG. 6 is where it gets even more interesting. Although originally designed to have a concave shape, further experimentation and testing showed an entirely unique set of movement when body 10 has a flat symmetrical shape. The direction it takes when lowered or raised (due to the horizontally balance connection) is very detailed and deceptive. This gives the angler ultimate control over the lure's action, especially in vertically suspended situations like ice fishing, or vertical jigging. A slight twitch may slide the lure in any direction and a foot of upward movement can create any one of a number of vibrations or sound effects detectable by fish. Because there is so much variety achievable in both sight movement and sound, this is an important variation of the basic concave design.

The flat design also makes the attachment of the jig hook 16 more solid with solder, weld or gluing techniques.

Figure 7:
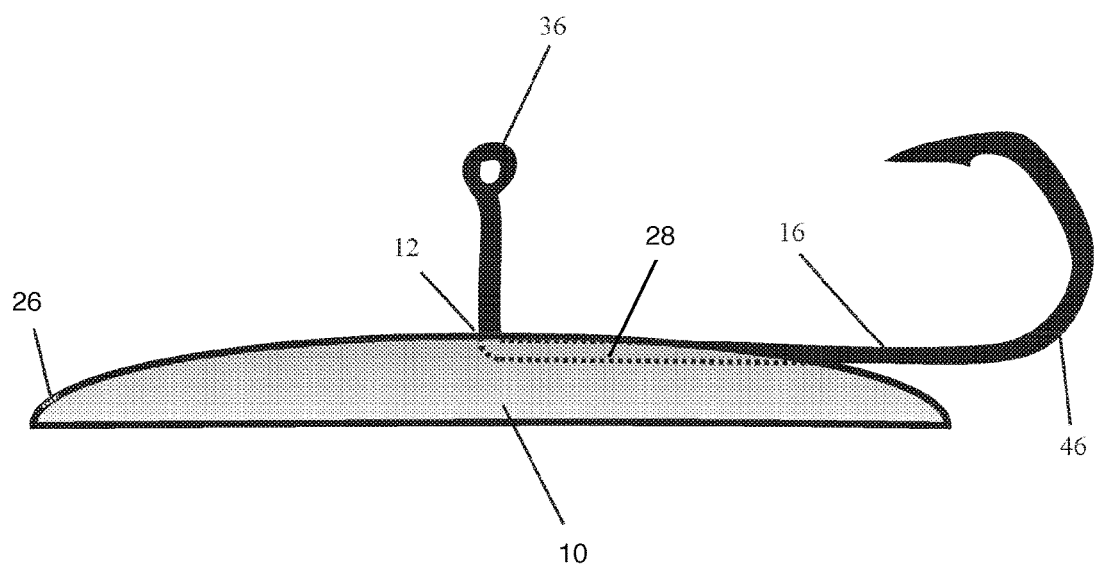
FIG. 7 is a side view view of a convex horizontally balanced fishing lure.

FIG. 7 illustrates yet another behavioral effect for this horizontally balanced symmetrical lure design, when a convex symmetrical shaped body 10 is used. Here the upward effect can be more dramatic visually, but with less sound and vibration. Conversely, as it is allowed to settle through the water column, more side movement and variations will occur. For the serious fisherman, this will open a new arena of lure manipulation and thus reaction from game fish. Sizes and symmetrical shape variations are endless and offering the angler actions and reactions not possible with the other major types of fishing lures, namely: plugs, spoons, spinners, jigs, and fly's.

This design will make the hook-to-body attachment easier since the convex design also creates a channel for the hook shank to rest.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A horizontally balanced fishing lure useful for vertical jigging fishing technique comprising:
   a lure body symmetrically shaped along the longitudinal axis, having a symmetrically shaped front and rear end, an upper and lower surface, and an aperture positioned substantially centrally on said longitudinal axis,
   a jig hook comprising a shank having an eye end and a barbed end attached to said lure body longitudinal axis by said shank, such that said eye end, configured as a fishing line connector, extends up through said aperture to said lure body upper surface, and said barbed end extends past said lure body rear end, and a channel extending rearward from said body aperture on a lower surface of said lure, to receive and secure the shank to the lure said aperture position defining the balance point of said lure such that said lure hangs horizontally from a fishing line configured to be attached to said jig hook eye end and to rest in a horizontal position in the water.

2. The horizontally balanced fishing lure of claim 1 wherein said lure body upper and lower surfaces together define a convex shape.

3. The horizontally balanced fishing lure of claim 1 wherein said lure body upper and lower surfaces together define a concave shape.

4. The horizontally balanced fishing lure of claim 1 wherein said lure body aperture is slightly forward of the midpoint of said longitudinal axis.

5. The horizontally balanced fishing lure of claim 1 wherein said jig hook comprises an attractor attached to said barbed end.

6. The horizontally balanced fishing lure of claim 1 wherein said jig hook comprises a weight attached to said jig hook eye end.

7. The horizontally balanced fishing lure of claim 1 further comprising a second aperture at said lure body front end.

8. A horizontally balanced fishing lure useful for vertical jigging fishing technique comprising:
   a lure body symmetrically shaped along the longitudinal axis, having a symmetrically shaped front and rear end, an upper and lower surface, a fishing line connector positioned substantially centrally on said longitudinal axis, and
   a jig hook comprising a shank having a barbed end attached to said lure body longitudinal axis by said shank such that said barbed end extends past said lure body rear end, and a channel extending rearward from said body aperture on a lower surface of said lure, to receive and secure the shank to the lure
   said fishing line connector position defining the balance point of said lure such that said lure hangs horizontally from a fishing line configured to be attached to said connector and to rest in a horizontal position in the water.

9. The horizontally balanced fishing lure of claim 8 wherein said upper and lower surfaces together define a concave shape.

10. The horizontally balanced fishing lure of claim 8 wherein said upper and lower surfaces together define a convex shape.

11. The horizontally balanced fishing lure of claim 8 wherein said fishing line connector position is slightly forward of the midpoint of said longitudinal axis.

12. The horizontally balanced fishing lure of claim 8 further comprising an attractor attached to said jig hook barbed end.

13. The horizontally balanced fishing lure of claim 8 further comprising a weight attached to said fishing line connector.

14. The horizontally balanced fishing lure of claim 8 further comprising a second fishing line connector at said lure body front end.

\* \* \* \* \*